United States Patent [19]

Frye et al.

[11] 4,245,530
[45] Jan. 20, 1981

[54] WEB SUPPORT MECHANISM

[75] Inventors: Kenneth G. Frye, Lee, Mass.; Donald C. Fitzpatrick, Chatham, N.Y.

[73] Assignee: Lenox Machine Company, Inc., Lenox, Mass.

[21] Appl. No.: 2,294

[22] Filed: Jan. 10, 1979

[51] Int. Cl.³ .......................................... B23D 19/04
[52] U.S. Cl. .................................... 83/99; 83/122; 83/402; 83/443
[58] Field of Search .................... 242/56.2–56.7; 83/98, 99, 113–122, 500–503, 443, 56, 402

[56] References Cited

U.S. PATENT DOCUMENTS

| 740,201 | 9/1903 | Stimpson | 83/122 |
|---|---|---|---|
| 747,598 | 12/1903 | Fales | 242/56.5 |
| 1,406,947 | 2/1922 | Evans | 242/56.2 |
| 2,032,276 | 2/1936 | Frielinghaus | 83/443 |
| 2,052,519 | 8/1936 | Smith | 83/122 |
| 2,202,843 | 6/1940 | Edwards | 83/122 X |
| 3,143,024 | 8/1964 | Markowski | 83/497 |
| 3,785,232 | 1/1974 | Frye et al. | 83/500 X |
| 3,828,633 | 8/1974 | Klingen | 83/56 |
| 3,976,237 | 8/1976 | Bossons | 83/98 X |

FOREIGN PATENT DOCUMENTS 383599  9/1971  U.S.S.R. ............................. 83/121

Primary Examiner—J. M. Meister
Attorney, Agent, or Firm—Dirk J. Veneman; Michael L. Gill; Gerald A. Mathews

[57] ABSTRACT

An apparatus for slitting paper having a plurality of pairs of cutting elements disposed transversely with respect to the direction of movement of the web and a pair of arcuate support boards extending about one row of slitter elements to a point closely adjacent the overlap of the slitter elements to provide an arcuate path of travel for the web as it passes through the cutting area. The arcuate support boards are mounted for rotation about transverse axes to facilitate rotation of the boards away from the cutting elements and thus provide access to such cutting elements for adjustment and maintenance.

12 Claims, 1 Drawing Figure

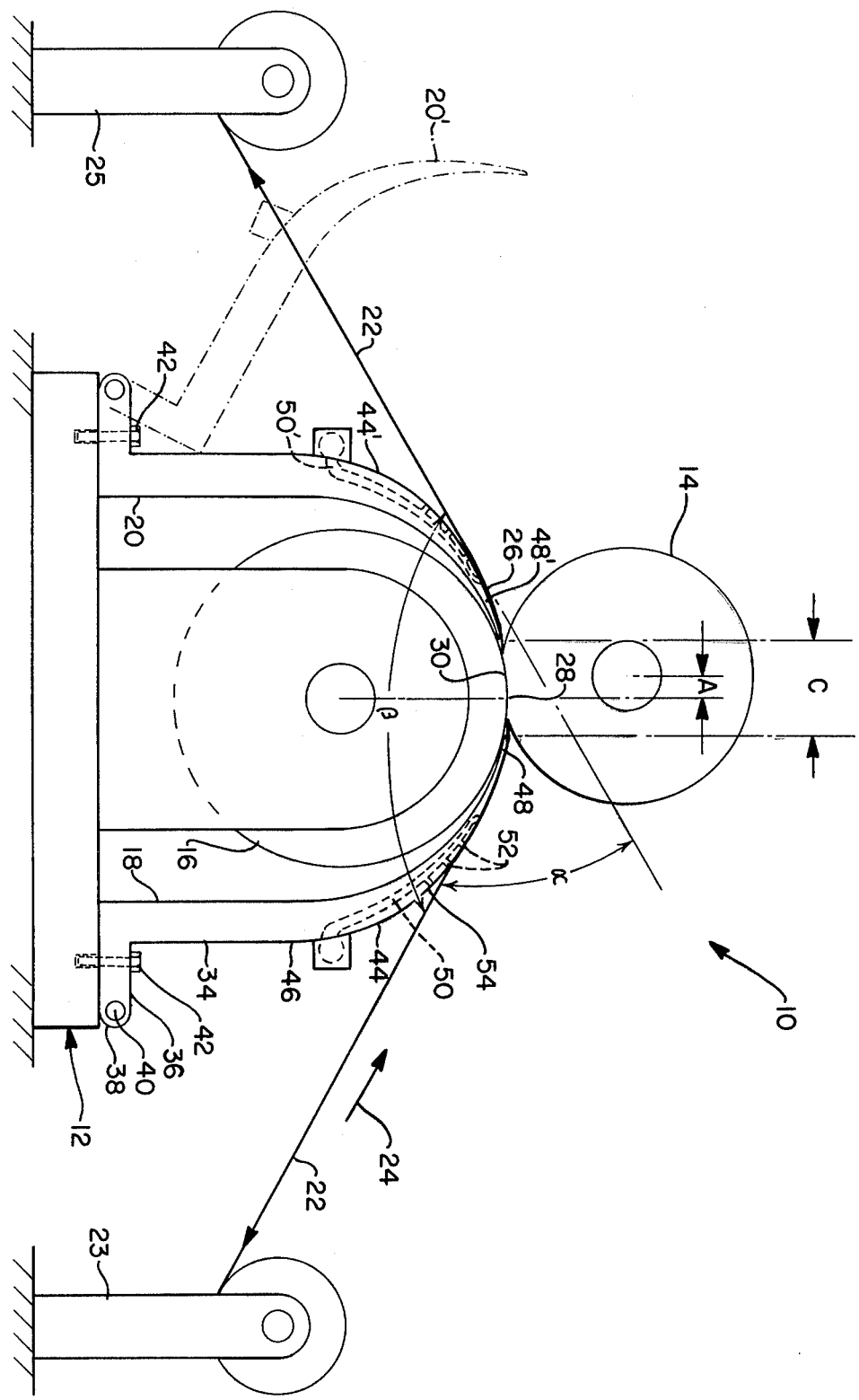

WEB SUPPORT MECHANISM

BACKGROUND OF THE INVENTION

This invention relates to slitting stations for paper and the like and more particularly to a method of providing for the stable and accurate positioning of the paper as it passes through the cut point.

One common support means for a traveling web to be slit longitudinally is what is known as the wrap around slitter. An example of this type of slitter can be seen in U.S. Pat. No. 3,828,633. This type of machine generally utilizes a plurality of slitter bands and spacer tubes disposed on a single shaft or axis. The direction of travel of the web is changed by wrapping the web around the slitter bands. While this system provides firm support for the web in the area of the bands, there can be a tendency, particularly with respect to lightweight sheets or webs, for the web to draw down into the gap between the bands thus causing distortion and irregularities in the web. Further, the axial adjustment of the slitter bands and thus the adjustment of the width of the slit web is limited in this type of slitter.

Another type of slitter, known as a kiss type slitter, is usually used for high speed operation. Examples of such slitters can be seen in U.S. Pat. Nos. 3,143,024 and 3,785,232. In this type of slitter, a generally straight run or flat portion of the web is provided by passing the web over a pair of spaced apart rollers or support boards to change direction of the web and provide a flat draw or run of web in the slitter area. Heretofore these web support means have been spaced apart sufficiently to permit access to both top and bottom slitters and have provided substantially straight run of web. While this type of slitter usually accommodates infinite adjustment of slitters along the width of the web and provides for easy adjustment of slit width, the web can have a tendency to flutter or vibrate through the flat draw area, thus causing some irregularities in the slit.

The present invention provides a method and means for overcoming the above noted deficiencies. In accordance with the present invention, arcuate support board means are specially designed to wrap around one slitter element and extend to a point closely adjacent the overlap of the slitter elements and provide for an arcuate path and thus a stiff run of the paper right at the cut point. This generally arcuate configuration of the paper in the area of the cut point provides stability and avoids flutter which can be experienced in a substantially flat run of paper. In order to permit and facilitate ready access to the slitter elements, the support boards are pivotally mounted on a support table in such manner that they can be rotated away from each other and the slitter elements which they surround. The slitters can then be infinitely adjustable in a known manner along the support shaft. This also provides easy access to the slitters for maintenance.

It is an object, therefore, of the present invention to provide accurate support for a traveling web through a slitter station without inhibiting the lateral adjustability of the blades.

Other objects will be in part apparent and in part pointed out more in detail hereinafter.

The invention accordingly consists in the features of construction, combination of elements and arrangement of parts which can be exemplified in the construction hereinafter set forth in the scope of the application of which will be indicated in the appended claims.

IN THE DRAWINGS

The single FIGURE is a side elevational view of a slitting station constructed in accordance with the present invention.

With reference to the drawing, there is illustrated a slitting station 10 which includes a stand or support table 12 and first or upper slitting elements 14 and second or lower slitting elements 16. The axial mounting and adjustment means for the slitting elements 14 and 16 are not illustrated in detail herein since such mounting and adjustment means are known to those skilled in the art. Further, it will be appreciated that the slitting elements 14 and 16 may be any combination of blades or bands.

A pair of arcuate support boards 18 and 20 are disposed on the upstream and downstream sides respectively of the lower series of cutting elements 16. These support boards 18 and 20 are continuous for the entire width of the slitting station and provide a gap C therebetween which also extends for the entire width of the slitting station. A web 22 of paper and the like can be continuously supplied from a web let off or supply means 23 and travels in the direction of arrow 24 toward the slitting station 10. It will be appreciated that while only one layer is shown for the web 22 that the web 22 can include one or more layers of paper or the like. The web 22 then changes direction as it passes over the support boards 18 and 20 and continues to a takeup or web receiving means 25.

The general configurations of the support boards 18 and 20 are quite similar and a detailed description of one will suffice for both. It will be appreciated that the support board 20 is basically a lefthand copy of the support board 18, the only significant difference being that the support board 18 extends about the lower cutting element 16 for greater distance than the support board 20 extends around the cutting element 16. This is necessitated by the fact that, as is common in the trade, the upper cutting element 14 is located a small amount downstream of the web relative to the lower cutting element 16. In this case, the offset A of the cutting element 14 downstream from the cutting element 16 is about 1".

More particularly, the support board 18 comprises a generally L-shaped portion 34 with the bottom leg 36 of the L resting upon the table 12. The outer extremity 38 of the lower leg 36 is pivotally supported on the table 12 at axis 40. The pivotal axis 40 extends transversely of the slitting station 10 and thus permits rotation of the support board outwardly away from the slitting elements 16, as illustrated in dashed lines. For purposes of this invention, transverse or cross machine directions shall be directions parallel to the web 22 and perpendicular to the direction of motion of the web 22. The support boards 18 and 20 are thus readily rotatable out of position to permit access to the lower slitting elements 16 for maintenance and adjustment. Suitable means, such as capscrews 42 extending through the lower leg 36 and into the table 12 can be utilized to secure the support board 18 in position adjacent the slitter elements 16.

The support board 18 includes an arcuate portion 44 which extends upwardly from the upper end 46 of the L 34 and generally curves about the lower slitting element 16 to a point closely adjacent the overlap area 30 of the slitting elements 14 and 16. The curved portion 44 tapers gradually as it extends from the upper end 46 of the L 34 to the terminal point 48 adjacent the overlap area 30. This provides maximum strength to the support board 18 and yet permits extension of the support to as close to the overlap area 30 as possible.

The arcuate portion 44 includes a chamber 50 which extends the entire width of the support board 18 and to as close to the terminal end 48 as is physically practical. A plurality of passageways 52 extend from the chamber 50 to the arcuate support surface 54 which supports the web 22. A source of pressurized air (not shown) communicates with the chamber 50 and ultimately through the passages 52 to provide an air flotation support for the web 22. This reduces the friction between the web 22 and the arcuate surface 54 of the support board 18.

This arrangement of support boards and slitter elements provides a curved path for the web of paper as it passes through the cut point 28 which is much more stable than the flat draw configuration heretofore utilized. It will be appreciated that a long flat draw of paper can be subject to flutter and vibration in the high speed operation of a slitting machine. The configuration of this invention, however, provides a gentle curve or arc to the paper as it passes through the cut point. This arced configuration of the paper at the critical point of cutting is much more stable and not susceptible to flutter or vibration.

In order to provide the most stable arc, it is desirable that the radius of curvature of the arc be relatively small and that the support boards for the arc on opposite sides of the cut point extend as close together as possible. Preferably, the gap C between the cut boards should be no greater than 2", and the arcs of the surface of the support boards should form a continuous radius with the paper. Thus, the terminal ends 48 and 48' of respective support boards 18 and 20 should taper to as thin a point as is practical within strength limitations. Also, the curved portions 44 and 44' should wrap around the lower slitting elements 8 as closely thereto as possible.

In the particular embodiment illustrated, the lower slitting elements are sharp blades 8" in diameter while the upper slitting elements are sharp blades 6" in diameter. The upper slitting elements 14 are offset downstream with respect to the lower slitting elements 16 a distance A equal to 1" and the gap C between the terminal points 48 and 48' of the support boards 18 and 20 respectively, is 1¾'. The path of the web 22 undergoes an angular direction change alpha as it approaches and leaves the support board. This angle change alpha provides a provides a curvature or arc Beta in the webs which extend the entire width of the machine to rigidify and stabilize the web at the cut point. The radii of curvature of the support surfaces 54 and 54' are both 5½" and both extend to the terminal points 48', 48.

The gap C extends for the entire width of the slitting station and thus there is nothing to interfere with the infinite adjustment of the cutting elements 14 and 16 along their respective axes in transverse directions. It can be seen, therefore, that the present invention has provided a method and means for maintaining the path of a moving web in a slitting machine in a secure position through the cutting station. Further, the web is free of flutter and vibration and provision is made for infinite adjustment of slitting widths.

While a certain representative embodiment and details have been shown for the purpose of illustrating the invention, it will be apparent to those skilled in this art that various changes and modifications may be made therein without departing from the spirit or scope of the invention.

What is claimed is:

1. In a web slitting apparatus of the type having a slitting station including a pair of rotary cutting elements in overlapping relation to provide a cut point, means for supplying a web of paper and the like to said slitting station and means for receiving the slit web from said slitting station; the improvement comprising:

arcuate support board means extending transversely of said slitting station and curving about one of said cutting elements to adjacent the overlapping area of said cutting elements to provide a continuous arcuate configuration to said web as said web passes said cut point, said support board means being continuous for the width of said station to form a narrow continuous gap for the width of said slitting station.

2. The improvement as claimed in claim 1 wherein said support board means comprise a pair of arcuate support boards located one each on opposite sides of said cut point and extending toward each other to provide said arcuate configuration.

3. The improvement as claimed in claim 2 wherein said support boards extend towards each other on opposite sides of said cut point a sufficient amount to provide a gap of less than 2" therebetween for the overlap area of said cutting elements.

4. The improvement as claimed in claim 2 wherein said support boards have a contacting surface for engaging said web and wherein means are provided for supplying a film of air between said cutting surface and said web to reduce sliding friction.

5. The improvement as claimed in claim 4 wherein said means for supplying a film of air comprises an air chamber in said support board extending adjacent said support surface for receiving compressed air and a mulitiplicity of passages extending from said air chamber to said support surface.

6. The improvement as claimed in claim 2 wherein said support boards each include a web supporting surface which has an arcuate configuration extending about said one cutting element and together the web supporting surfaces closely approximate the curvature of said cutting element to provide an arcuate configuration of said paper closely resembling the radius of said one cutting element.

7. The improvement as claimed in claim 2 further characterized by a support means carrying said support boards and means mounting said support boards on said support means for rotation about a pair of axes extending transversely of said slitting station to rotate said support boards away from each other and said one cutting element to permit access to said one cutting element.

8. The improvement as claimed in claim 5 wherein said support boards extend towards each other on opposite sides of said cut point a sufficient amount to provide a gap of less than 2" therebetween for the overlap area of said cutting elements.

9. The improvement as claimed in claim 8 further characterized by a support means carrying said support boards and means mounting said support boards on said support means for rotation about a pair of axes extending transversely of said slitting station to rotate said support boards away from each other and said one cutting element to permit access to said one cutting element.

10. The improvement as claimed in claim 1 wherein said support board means comprises an arcuate support board disposed on the upstream side of said cut point and extends about said one of said cutting elements to a point closely adjacent said cut point.

11. The improvement as claimed in claim 10 wherein said support board has a cutting surface for engaging said web and means are provided for supplying a film of air between said cutting surface and said web to reduce sliding friction.

12. The improvement as claimed in claim 10 further characterized by a support means for carrying said support board and means mounting said support board on said support means for rotation about an axis extending transversely of said slitting station to rotate said support board away from said one cutting element.